(12) United States Patent
Krastev et al.

(10) Patent No.: US 8,345,336 B2
(45) Date of Patent: Jan. 1, 2013

(54) MEMS SCANNING MICROMIRROR WITH REDUCED DYNAMIC DEFORMATION

(75) Inventors: Krassimir T. Krastev, Eindhoven (NL); Hendrikus W. L. A. M. van Lierop, Eindhoven (NL); Hermanus M. J. R. Soemers, Eindhoven (NL); Renatus H. M. Sanders, Eindhoven (NL)

(73) Assignee: Innoluce B.V., Eindhoven (NL)

( * ) Notice: Subject to any disclaimer, the term of this patent is extended or adjusted under 35 U.S.C. 154(b) by 329 days.

(21) Appl. No.: 12/681,621

(22) PCT Filed: Oct. 2, 2008

(86) PCT No.: PCT/IB2008/054028
§ 371 (c)(1),
(2), (4) Date: Aug. 6, 2010

(87) PCT Pub. No.: WO2009/044360
PCT Pub. Date: Apr. 9, 2009

(65) Prior Publication Data
US 2010/0290142 A1    Nov. 18, 2010

Related U.S. Application Data

(60) Provisional application No. 60/977,713, filed on Oct. 5, 2007.

(51) Int. Cl.
*G02B 26/08* (2006.01)
(52) U.S. Cl. .................. 359/198.1; 359/221.2
(58) Field of Classification Search .... 359/198.1–199.4, 359/200.6–200.8, 221.2, 224.1–224.2, 226.1–226.2, 359/871–872; 248/466
See application file for complete search history.

(56) References Cited

U.S. PATENT DOCUMENTS
2004/0165289 A1    8/2004    Ealey
(Continued)

FOREIGN PATENT DOCUMENTS
WO    WO 2009/044360 A1    4/2009
(Continued)

OTHER PUBLICATIONS

Shu-Ting Hsu, et al., "Ultra flat high resolution microscanners," Optical MEMS and Nanophotonics, 2007 IEEE/LEOS International Conference ON, IEEE, PI, Aug. 1, 2007, pp. 197-198, XP031155636, ISBN:978-1-4244-0641-8.
(Continued)

*Primary Examiner* — James Phan
(74) *Attorney, Agent, or Firm* — Hoffmann & Baron, LLP

(57) ABSTRACT

A MEMS scanning micromirror with reduced dynamic deformation with a mirror support including a rotation axis beam 120 having a rotation axis 58; a pair of extension bars 56 parallel to the rotation axis 58, each having a first end 140, a midpoint 142, and a second end 144; and a pair of X beams 130, each of the pair of X beams 130 having a cross midpoint 134. One of the pair of X beams 130 is connected to the first end 140 and the midpoint 142 of each of the pair of extension bars 56; the other of the pair of X beams 130 is connected to the midpoint 142 and the second end 144 of each of the pair of extension bars 56; and the rotation axis beam 120 is connected to the cross midpoint 134 of each of the pair of X beams 130.

25 Claims, 14 Drawing Sheets

U.S. PATENT DOCUMENTS

2007/0291343 A1* 12/2007 Kato et al. .................. 359/198
2009/0040636 A1* 2/2009 Klemens et al. ............. 359/872

FOREIGN PATENT DOCUMENTS

WO WO 2009044324 A2 4/2009

OTHER PUBLICATIONS

Chang-Hyeon Ji, et al., "An electrostatic scanning micromirror with diaphragm mirror plate and diamond-shaped reinforcement frame," Journal of Micromechanics & Microengineering, Institute of Physics Publishing, Bristol, GB, vol. 16, No. 5, May 1, 2006, pp. 1033-1039, XP020104998, ISSN: 0960-1317.

Milanovic, et al., "Gimbal-Less Monolithic Silicon Actuators for Tip-Tilt-Piston Micromirror Appliations," IEEE Journal of Selected Topics in Quantum Electronics., IEEE Service Center, Piscataway, N.J., U.S., vol. 10, No. 3, May 1, 2004, pp. 462-471, XP011116292, ISSN: 1077-260X, Figures: 11, 12: p. 469, p. 470.

Alexander Wolter, et al., "Scanning 2D micromirror with enhanced flatness at high frequency," Proceedings of the SPIE, vol. 6114, 2006, pp. 61140L-1-61140L-8, XP002512677, Abstract; Figures: 2, 3.

Lixia Zhou, et al., "Scanning Micromirrors Faricated by an SOI/SOI Wafer-Bonding Process," Journal of Microelectromechanical Systems, vol. 15, No. 1, Feb. 2006, pp. 24-32, XP002512678, Figure: 9.

* cited by examiner

MEMS SCANNING MICROMIRROR WITH REDUCED DYNAMIC DEFORMATION

The technical field of this disclosure is Micro Electro Mechanical Systems (MEMS), particularly, MEMS scanning micromirrors.

MEMS scanning micromirrors have been developed for the display of visual information. The MEMS scanning micromirror oscillates in one or two dimensions and a laser or other light beam reflects from the mirror surface. Varying the angle and timing of the beam incident on the mirror surface generates a visual image on a screen or other surface, such as a two dimensional display matrix. Different numbers of MEMS scanning micromirrors and lasers are used to produce images of different detail and colors. Exemplary uses for the MEMS scanning micromirrors are head up displays for automotive applications, wearable displays, projection displays, mobile phone and hand-held displays, and barcode scanners.

The present generation of MEMS scanning micromirrors includes a mirror plate attached to a frame by two collinear torsion beams, which create a scanning axis about which the mirror plate rotates. The torsion beams both support the mirror plate and provide the required torsional stiffness during rotation. The torsion beams are the only point of attachment between the mirror plate and the frame, and determine the resonant frequency of the MEMS scanning micromirror. The MEMS scanning micromirror also includes a driver to magnetically or electrically apply a torque to the mirror plate about the scanning axis without physical contact with the mirror plate. The driver typically drives the mirror plate at the resonant frequency. MEMS scanning micromirrors are made from single crystal silicon or polysilicon material using photolithography.

Problems with image quality in the present generation of MEMS scanning micromirrors occur due to dynamic mirror deformation. High image resolution is desirable for better image quality and larger displays. Deformation should not be higher than $\pm\lambda/10$, where $\lambda$ is the shortest laser wavelength used in the scanning application. Image resolution is proportional to the product of scanning angle and micromirror diameter. Higher image resolution requires larger scanning angles, which increase the stress in the torsion beam, or larger mirror diameter, which increase the dynamic mirror deformation. In both cases higher scanning frequencies are required, which increase micromirror dynamic deformation. Because the torsion beams are the only point of attachment of the micromirror, when oscillate at resonance frequency the mirror plate and the mirror deform under the acceleration forces, balanced by the restoration forces in the torsion beam suspension.

The combination of these forces induce typical deformation pattern in the micromirror surface with S-shape in cross-sections perpendicular to the micromirror tilt axis and arc- or saddle-like deformation parallel to the tilt axis with opposite direction in cross-sections on both sides of the axis. In cross-sections parallel to the tilt axis, the largest deviation from linearity due to deformation appears between their endpoints and midpoints and it is greatest at the micromirror sides parallel to the axis.

One approach to reduce micromirror dynamic deformation has been to make the mirror plate thicker to better resist bending moments. Unfortunately, the greater micromirror mass and mass inertia moment requires higher suspension stiffness to maintain certain resonance frequency, which leads to increased stress in the suspension material. Stress in the micromirror suspension is a limiting factor in achieving higher oscillation frequencies and better scanning resolution. The extra mass in the in the system reduces the out-of-plane mode resonance frequencies of the micromirror and makes the oscillator more vulnerable to parasitic oscillations due to imperfections and external disturbances, which reduces the performance and image quality as well. Therefore, the increased thickness and mass inertia moment further limits the achievable image quality. Adding mass 27 on both sides of the torsion beams to balance the deformation due to inertia forces as illustrated in FIG. 1 has a similar effect on the image quality as well.

Another approach to reduce micromirror dynamic deformation has been to increase thickness, but remove material from the back of the mirror plate beneath the micromirror surface to reduce mass. FIG. 1 is a bottom perspective view of a mirror plate with a diamond frame pattern. The mirror plate 20 with a rotation axis 22 forms diamond shaped stiffeners 26 perpendicular to the rotation axis 22 through the removal of triangular cutouts 28. The diamond shaped stiffeners 26 act as a straight beam transverse to the rotation axis 22, with the most mass near the rotation axis 22 for strength and the least mass away from the rotation axis 22 to reduce the moment of inertia. The width of the last diamond shaped stiffener 26 is large near the rotation axis 22 defined by the torsion beam 29 since the operating stress is high in this area. Another system of material removal forms a uniform honeycomb shaped pattern across the back of the mirror plate. While the diamond and honeycomb shaped patterns reduce the mass inertia and therefore the forces acting on the mirror plate, they reduce the torsional stiffness of the mirror plate 20 along the rotation axis 22 as well, which leads to insufficient reduction of the micromirror dynamic deformation. They fail to optimally couple the points of the micromirror subject to the most deformation in direction parallel to the rotation axis, which are the corners and the midpoints of the sides of the micromirror.

It would be desirable to have a MEMS scanning micromirror with reduced dynamic deformation that would overcome the above disadvantages.

One aspect of the present invention provides a mirror support for a MEMS scanning micromirror including a rotation axis beam having a rotation axis; a pair of extension bars parallel to the rotation axis, each of the pair of extension bars having a first end, a midpoint, and a second end; and a pair of X beams, each of the pair of X beams having a cross midpoint. One of the pair of X beams is connected to the first end and the midpoint of each of the pair of extension bars; the other of the pair of X beams is connected to the midpoint and the second end of each of the pair of extension bars; and the rotation axis beam is connected to the cross midpoint of each of the pair of X beams.

Another aspect of the present invention provides a mirror support for a MEMS scanning micromirror including a rotation axis beam having a rotation axis; a first extension bar parallel to the rotation axis; a second extension bar parallel to the rotation axis; a first X beam; and a second X beam. The first X beam is connected between the first extension bar and the second extension bar; the second X beam is connected between the first extension bar and the second extension bar, the second X beam being adjacent the first X beam; and the rotation axis beam is connected to a cross midpoint of the first X beam and a cross midpoint of the second X beam.

Another aspect of the present invention provides a method of manufacturing a mirror support for a MEMS scanning micromirror including providing a single crystal silicon wafer having a direction of higher material stiffness; and forming the mirror support from the single crystal silicon wafer, the mirror support comprising a rotation axis beam having a rotation axis, a pair of extension bars parallel to the rotation axis, a pair of X beams having a pair of cross beams connected to each of the pair of extension bars and connected to the rotation axis beam at a cross midpoint. The cross beams are oriented along the direction of higher material stiffness.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

Figure 8A:
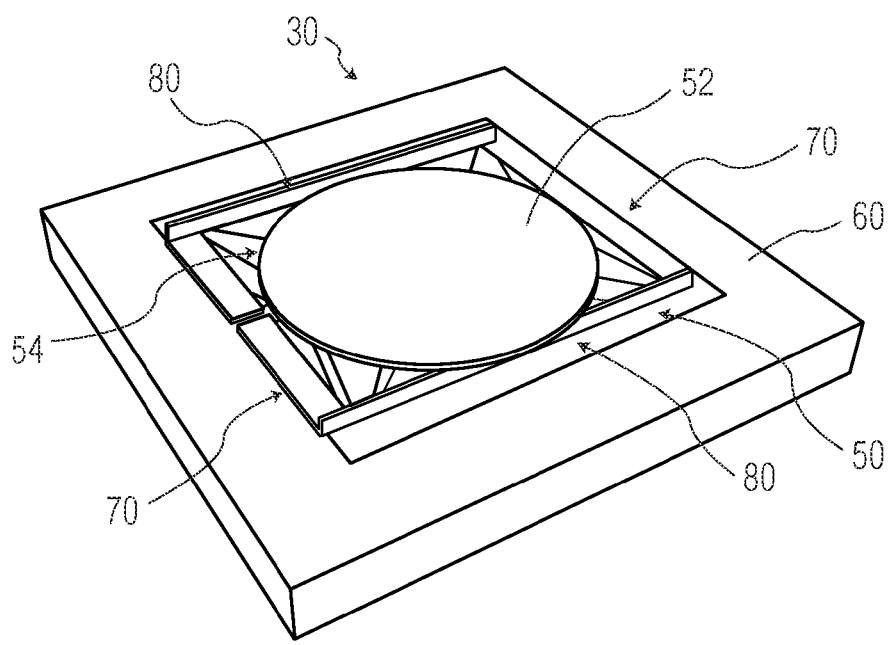
Figure 8B:
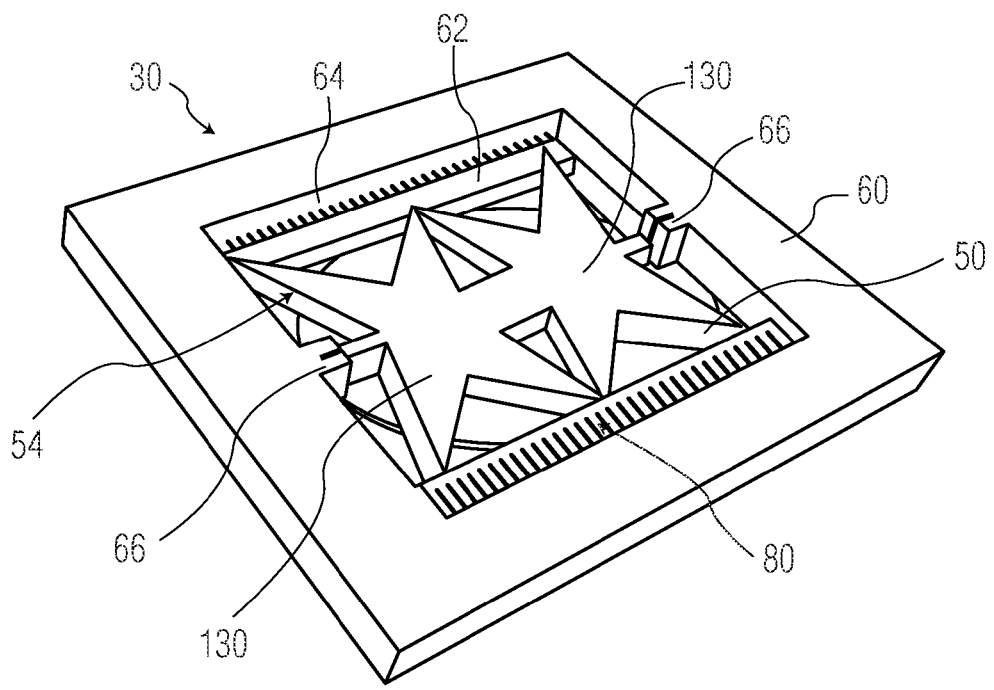
Figure 9A:
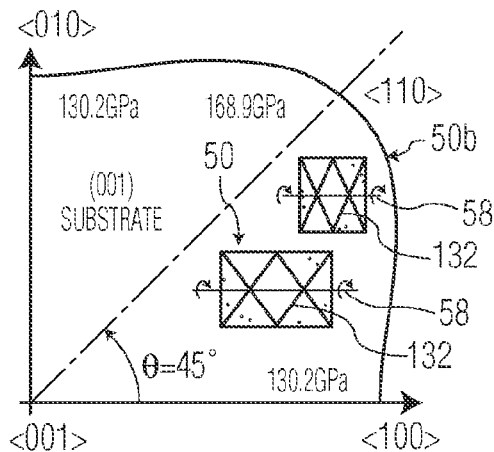
Figure 9B:
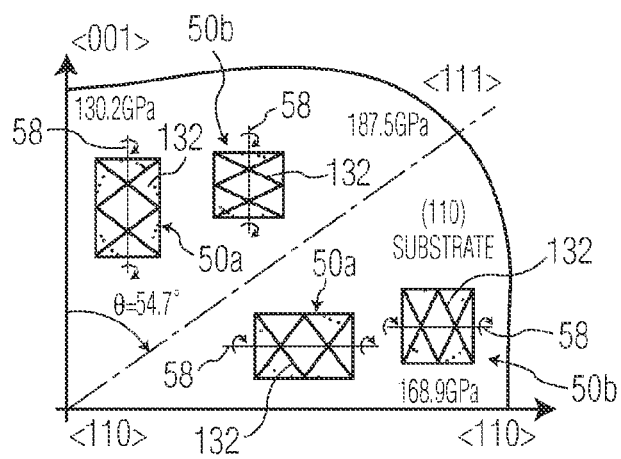
Figure 10:
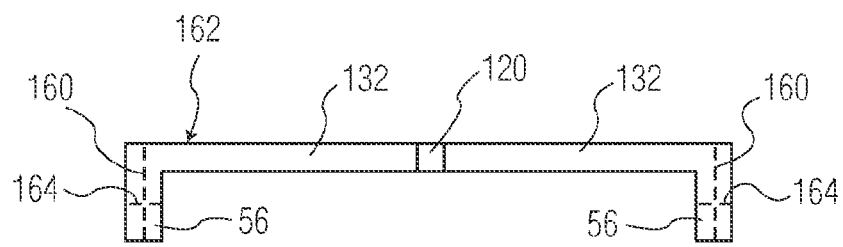
Figure 11A:
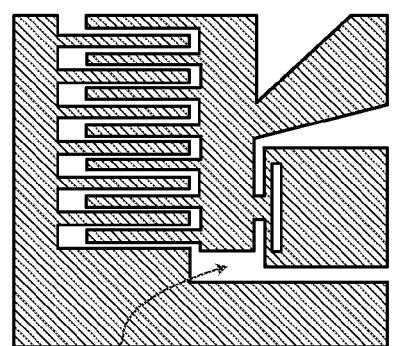
Figure 11B:
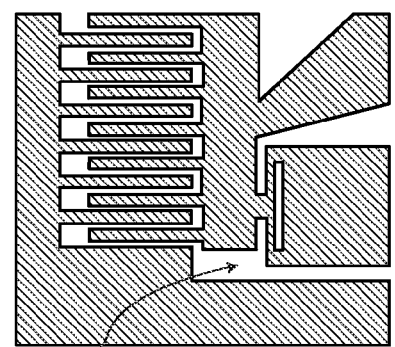
Figure 11C:
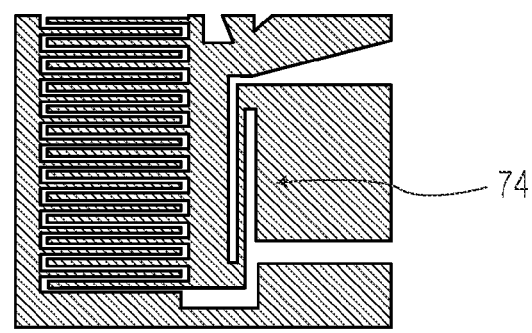
Figure 11D:
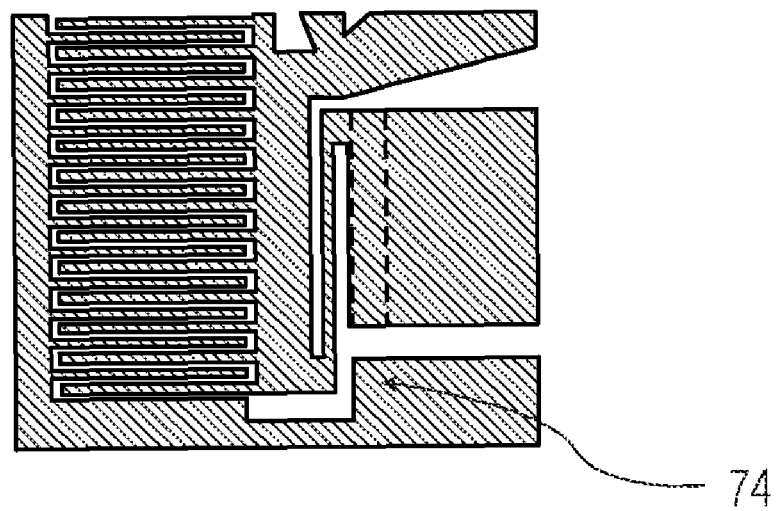
Figure 11E:
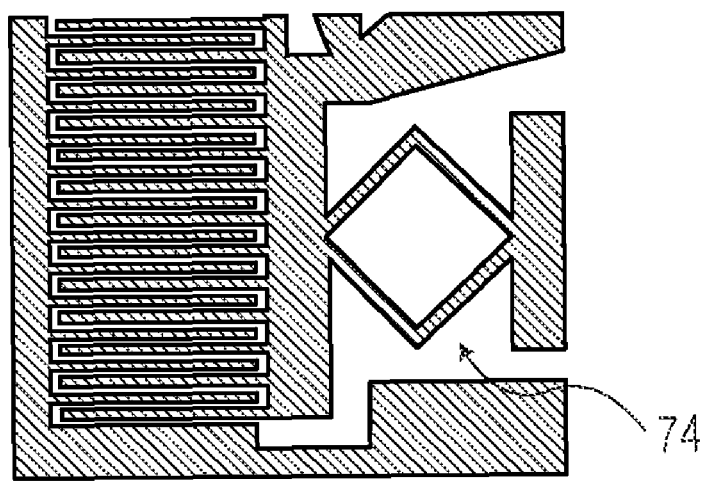
Figure 12:
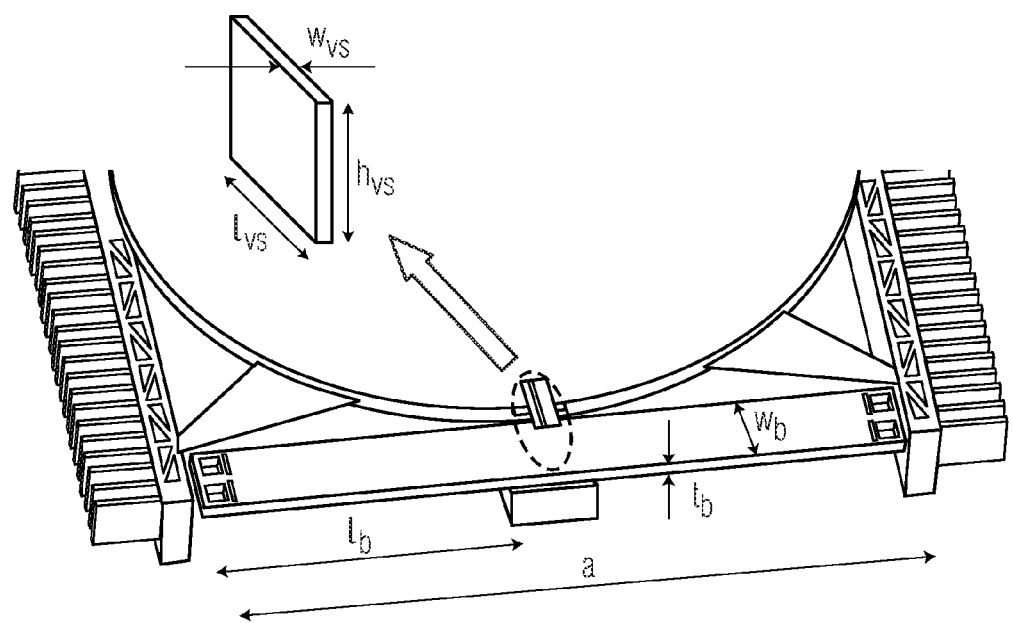

FIGS. 8A-8B are top perspective and bottom perspective views, respectively, of a mirror body for a MEMS scanning micromirror in accordance with the present invention; and FIGS. 9A-9B are graphs of Young's modulus for silicon with orientations of a mirror body for a MEMS scanning micromirror in accordance with the present invention; and FIG. 10 is an end view of another embodiment of a mirror body for a MEMS scanning micromirror in accordance with the present invention;

FIGS. 11A-11E are detailed top views of flexible links of a mirror body for a MEMS scanning micromirror in accordance with the present invention; and FIG. 12 is a detailed perspective view illustrating dimensions of a mirror body for a MEMS scanning micromirror in accordance with the present invention.

APPENDIX I: ACTUATOR ELECTRICAL CONNECTIONS

Figure 1:
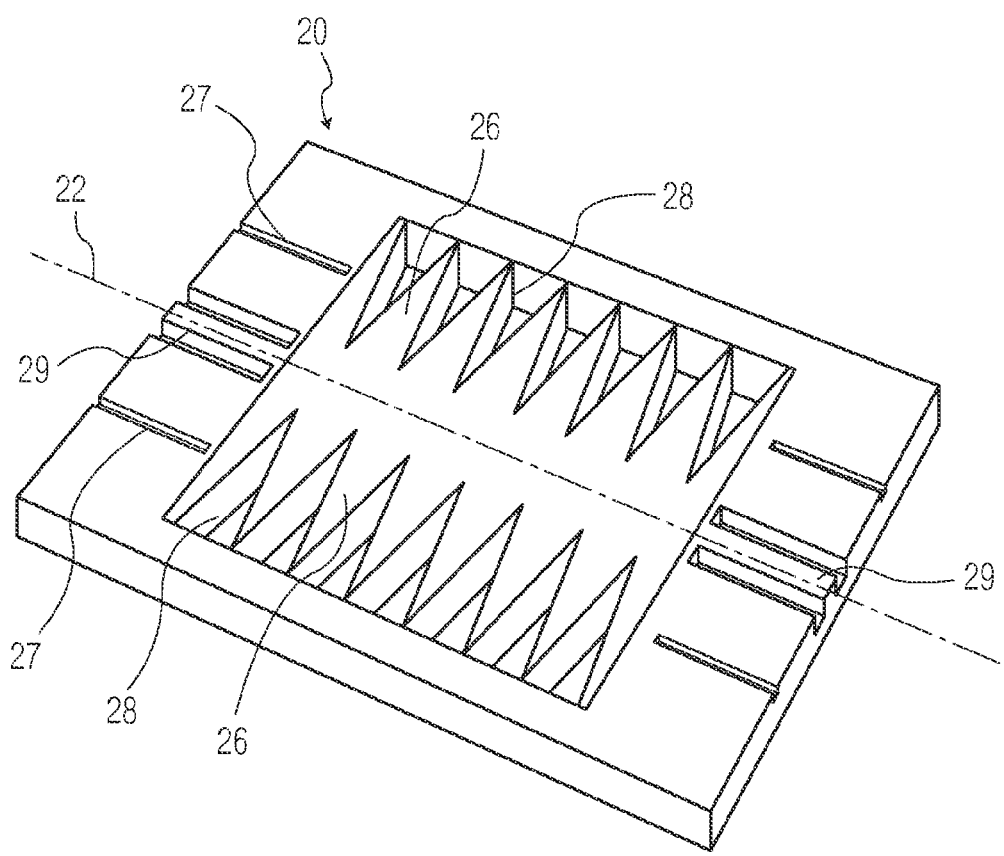
FIG. 1 is a bottom perspective view of a mirror plate with a diamond frame pattern.
Figure 2A:
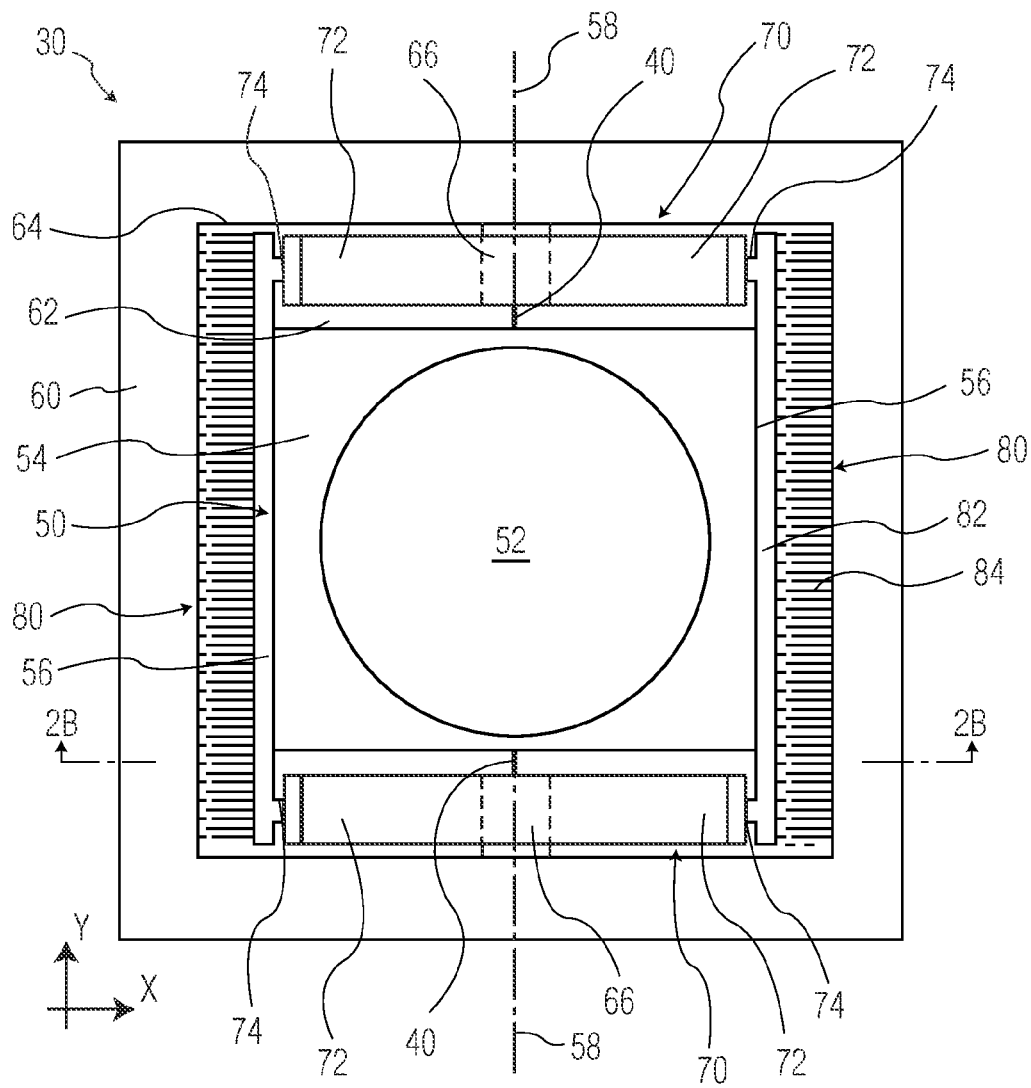
FIGS. 2A-2B are a top and cross section view, respectively, of a MEMS scanning micromirror in accordance with the present invention.
Figure 2B:
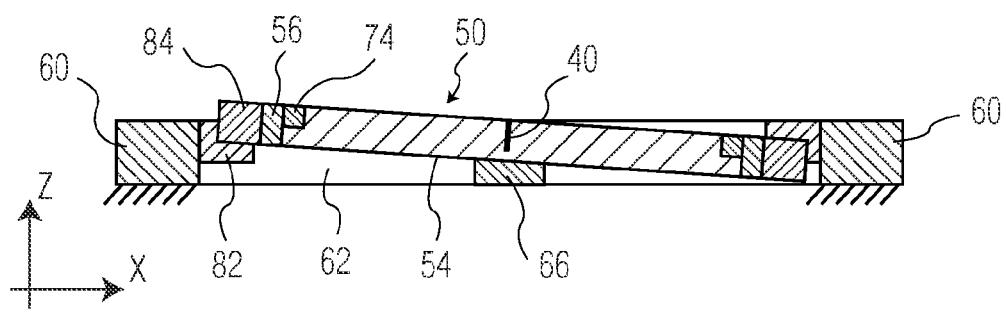

FIGS. 2A-2B, in which like elements share like reference numbers, are a top and side view, respectively, of a MEMS scanning micromirror in accordance with the present invention. FIG. 2B is a cross section along section A-A of FIG. 2A with the mirror body tilted about the rotation axis. The MEMS scanning micromirror uses a pair of cantilever beam assemblies coupled to a mirror body at its outer corners to set the torsional stiffness about the rotation axis. A pair of vertical support beams supports the mirror body vertically at the rotation axis, but have a negligible effect on the torsional stiffness, so that the natural frequency of the mirror body is substantially determined by the cantilever beam assemblies. The natural frequency is substantially independent of the vertical support beams. The natural frequency as defined herein is the undamped frequency of the mirror body about its rotation axis. The vertical support beams define the out-of-plane rocking and vertical mode stiffness for the corresponding mode resonant frequencies. The torsional stiffness can be decoupled from the out-of-plane rocking and vertical mode stiffness so that the out-of-plane rocking and vertical mode frequencies can be set to desired values, such as higher values, without influencing the torsional mode stiffness and resonant frequency. As defined herein, the Y axis is along the rotation axis, the X axis is perpendicular the Y axis on the mirror plane when the mirror is at rest, and the Z axis is perpendicular to and out of the mirror plane when the mirror is at rest.

The MEMS scanning micromirror 30 includes a mirror body 50, a frame 60, cantilever beam assemblies 70, and vertical support beams 40. The mirror body 50 has a mirror 52 on a mirror support 54, and extension bars 56. In one embodiment, the mirror 52 is formed on the mirror support 54. In another embodiment, the mirror 52 is attached to the mirror support 54. The mirror body 50 can be square, rectangular, circular, elliptical, or any other planar shape desired for a particular application. The face of the mirror defines a mirror plane of the mirror support 54. Those skilled in that art will appreciate that the shape of the mirror 52 and the mirror support 54 are independent and can be any shape desired for a particular application, e.g., a circle, ellipse, square, rectangle, or other shape as desired. The extension bars 56 are parallel to rotation axis 58 of the mirror body 50, which is the rotation axis for the MEMS scanning micromirror 30. The mirror body 50 is disposed within a mirror recess 62 of the frame 60.

The frame 60 forms the mirror recess 62 with a recess periphery 64. Opposed frame bars 66 are located on the recess periphery 64 along the rotation axis 58 and provide the connection points for the cantilever beam assemblies 70 and the vertical support beams 40.

The cantilever beam assemblies 70 include cantilever beams 72 fixed to the opposed frame bars 66 perpendicular to the rotation axis 58. The cantilever beam assemblies 70 provide torsional stiffness to the micromirror body 50 about the rotation axis 58. The cantilever beams 72 are also flexibly or compliantly coupled to the end of the extension bars 56 of the mirror body 50 with flexible links 74. The flexible links 74 have low torsional stiffness around their axes parallel to the rotation axis 58 (around the Y axis) and reduced stiffness perpendicular to the rotation axis 58 (the X axis), which allows the mirror body 50 to rotate around the vertical support beams 40 relative to the rotation axis 58. The attachment of the mirror body 50 to the four points away from the rotation axis 58 reduces dynamic deformation in the mirror body 50. The torsional stiffness for rotation of the mirror around the Y axis is defined by the length, width, and most importantly the thickness of the cantilever beams 72 and the distance between flexible links 74 for the pair of cantilever beams 72 in a cantilever beam assembly 70. The combined stiffness in X direction of the vertical support beams 40 and the flexible links 74 prevent the movement of the mirror body 50 perpendicular to the rotation axis 58 (in the X direction) during operation. More detail on the flexible links 74 is provided below for FIG. 11.

The vertical support beams 40 are connected between the opposed frame bars 66 and the mirror body 50 along the rotation axis 58 to support the micromirror body 50 in the frame 60. In one embodiment, the vertical support beams 40 have narrow rectangular cross sections perpendicular to the rotation axis 58, with the long axis of the rectangle perpendicular to the face of the mirror 52 and the mirror body 50, and the short axis of the rectangle parallel to the face of the mirror 52. The torsional stiffness of the MEMS scanning micromirror 30 is provided by the cantilever beam assemblies 70, so the vertical support beams 40 are only required for support of the mirror body 50 and have a negligible effect on the torsional stiffness. The torsional stiffness of the vertical support beams 40 is as low as possible so that the torsional stiffness of the micromirror body rocking movement about the vertical support beams 40 relative to the rotation axis 58 is dominated by the stiffness of the cantilever beams 72. The vertical support beams 40 are sized so that the stiffness against vertical displacement of the mirror body 50 and against its rocking movement perpendicular to the rotation axis 58 (around the X axis) is as high as possible.

The MEMS scanning micromirror 30 can also include actuator 80 to provide torque to drive the mirror body 50 about the rotation axis 58. In one embodiment, the actuator 80 includes mirror combs 82 attached to the extension bars 56 interleaved with frame combs 84 attached to the frame 60. Applying a difference in electrical potential between an interleaved mirror comb 82 and frame comb 84 creates a driving force between the mirror combs 82 and the frame combs 84, which creates a torque on the mirror body 50 about the rotation axis 58. An oscillating electrical potential can be applied to drive the MEMS scanning micromirror 30 at its natural frequency. Other exemplary actuation methods include electromagnetic actuation and piezoelectric actuators. In electromagnetic actuation, the micromirror is "immersed" in a magnetic field and an alternating electric current through the conductive paths creates the required oscillating torque around the rotation axis 58. Piezoelectric actuators can be integrated in the cantilever beams or the cantilever beams can be made of piezoelectric material to produce alternating beam bending forces in response to an electrical signal and generate the required oscillation torque.

The MEMS scanning micromirror 30 can be manufactured from single crystal silicon or polysilicon material using photolithography. FIG. 3, in which like elements share like reference numbers with FIG. 2, is a detailed perspective view of comb fingers for a MEMS scanning micromirror in accordance with the present invention. The comb fingers 100 of the mirror comb 82 are interleaved with the comb fingers 110 of the frame comb 84. In one embodiment, the MEMS scanning micromirror can be manufactured from a silicon-on-insulator (SOI) wafer having an upper silicon layer and a lower silicon layer, with an insulating layer between the upper silicon layer and the lower silicon layer. In one embodiment, the mirror comb 82 and the frame comb 84 can be fabricated so that the insulating layer divides the combs parallel to the mirror, producing electrically isolated upper electrical portions and lower electrical portions in each of the comb fingers. The comb fingers 100 of the mirror comb 82 include first electrical portions 102 and second electrical portions 104 separated by insulating layer 106. The comb fingers 110 of the frame comb 84 include first electrical portions 112 and second electrical portions 114 separated by insulating layer 116. Applying a difference in electrical potential between the upper electrical portions in the mirror comb 82 and the lower electrical portions in the frame comb 84, or vice versa, can be used to generate an initial driving force between the mirror combs 82 and the frame combs 84 when the mirror combs 82 and the frame combs 84 are aligned and the mirror body 50 is at rest. In one embodiment, the cantilever beam assemblies can be fabricated in the upper silicon layer of the silicon on insulator wafer and can bring the electrical potential to the top first electrical portions 102 of the mirror combs 82. In another embodiment, the vertical support beams can be fabricated in the lower silicon layer of the silicon on insulator wafer and can bring the electrical potential to the bottom second electrical portions 104 of the mirror combs 82.

Figure 3A:
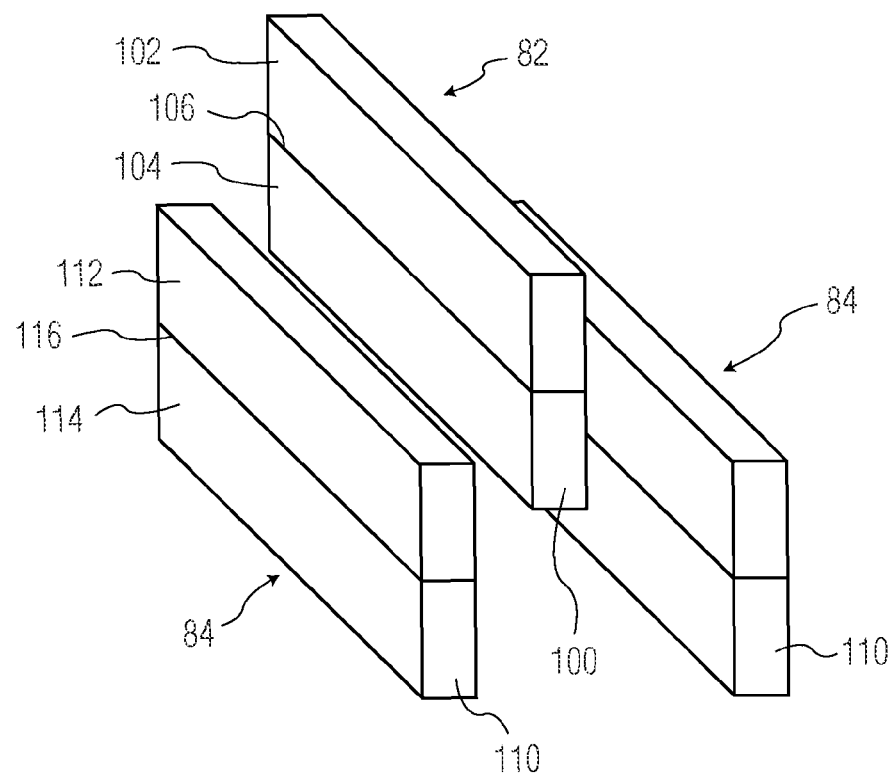
FIG. 3 is a detailed perspective view of comb fingers for a MEMS scanning micromirror in accordance with the present invention.
Figure 3B:
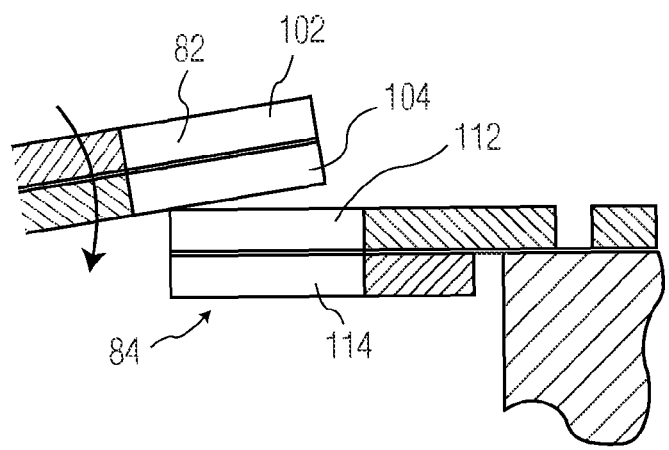

FIGS. 3B-3E illustrate the action of the mirror combs 82. Referring to FIG. 3B, the mirror is oscillating, with the mirror comb fingers away from the frame fingers and moving towards them. 102 and 104 connected to ground potential. Driving potential is applied to 112 and 114 from max. amplitude to aligned position of the comb fingers.

Figure 3C:
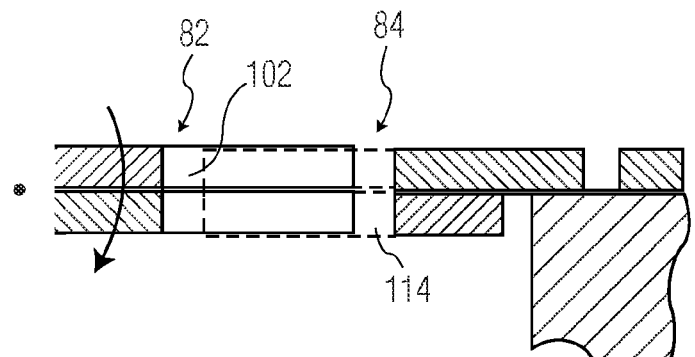

Referring to FIG. 3C, the mirror is oscillating in the clockwise direction, when comb fingers are in aligned position. The driving cycle for the traditional monolith comb fingers stops here. The driving potential must be switched off at aligned comb fingers position if there is no split of the comb fingers in top and bottom electric parts. For split comb fingers of the present invention: Potential is applied between 102 (grounded) and 114 until 102 became aligned with 114, so the split comb fingers inject more energy per oscillation cycle for equal other conditions.

Figure 3D:
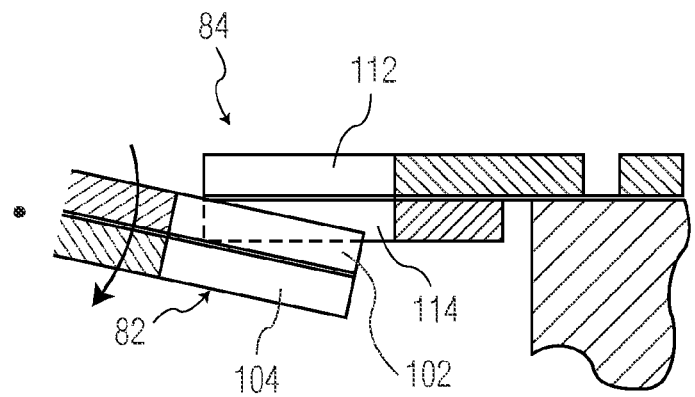
Figure 3E:
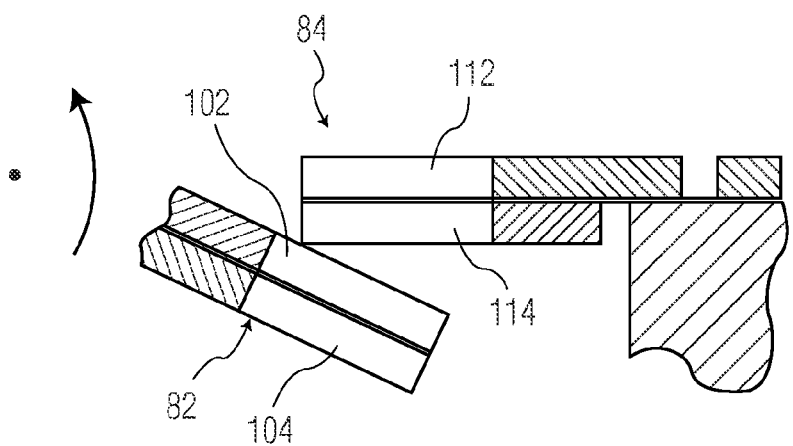

Referring to FIG. 3D, the mirror is oscillating. When the opposing layers 102 and 114 of split comb fingers are in aligned position (no torque created); the driving potential between them must be switched off.

Referring to FIG. 3D, the mirror is oscillating at extreme (FIG. 3B) position. For rotation in opposite direction the driving potentials are switched in "mirrored order" to the given in FIGS. 4B-4D:
1. 102, 104 grounded and 112,114 at driving potential;
2. Driving potential between 104 (grounded) and 112;
3. Driving potentials switched off.

Figure 4A:
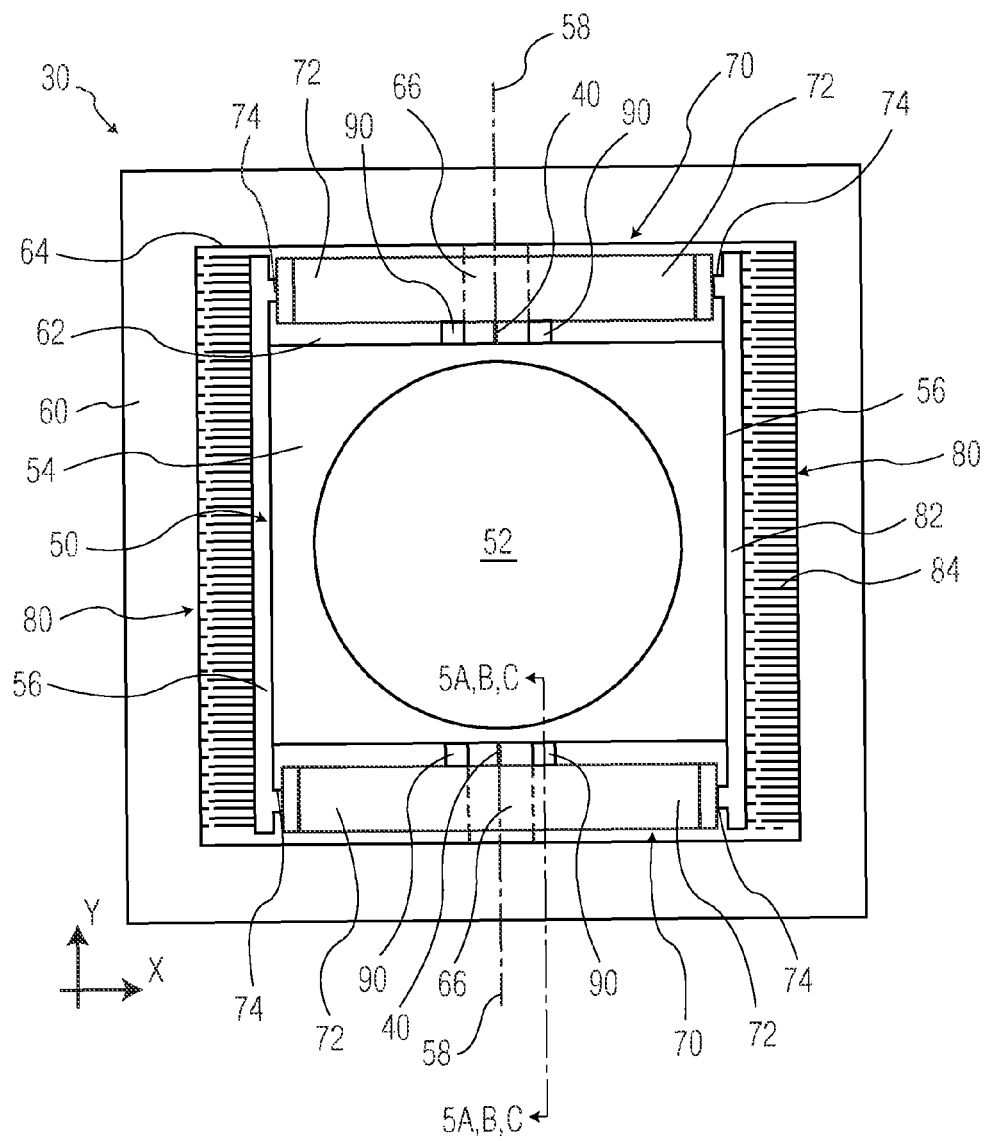
FIGS. 4A-4B are top views of other embodiments of a MEMS scanning micromirror in accordance with the present invention.
Figure 4B:
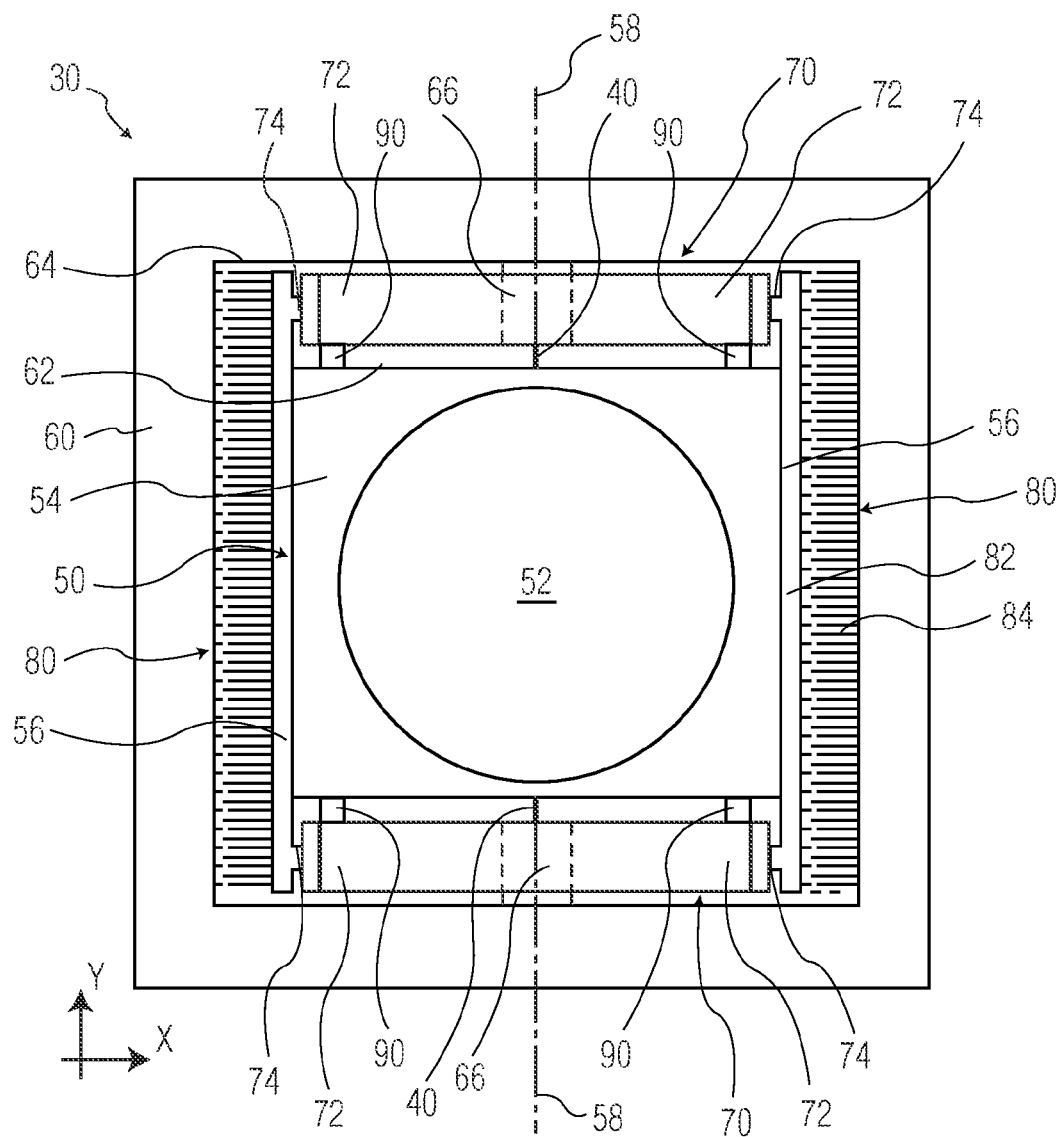

FIGS. 4A-4B, in which like elements share like reference numbers with each other and with FIG. 2, are top views of other embodiments of a MEMS scanning micromirror in accordance with the present invention. In these embodiments, leaf springs flexibly coupled between the cantilever beams of the cantilever beam assemblies and the mirror body can be used to stiffen the mirror body of the MEMS scanning micromirror against in-plane disturbances and increase in-plane slide and rotation stiffness of the mirror suspension. The leaf springs springily couple the micromirror body to the cantilever beam assemblies.

The leaf springs can be positioned along the cantilever beams as desired for a particular application. Referring to FIG. 4A, leaf springs 90 are flexibly coupled between the cantilever beams 72 of the cantilever beam assemblies 70 and the mirror body 50. In this example, the leaf springs 90 are near the vertical support beams 40 and the opposed frame bars 66. Referring to FIG. 4B, the leaf springs 90 are flexibly coupled between the cantilever beams 72 of the cantilever beam assemblies 70 and the mirror body 50. In this example, the leaf springs 90 are near the flexible links 74.

Figure 5A:
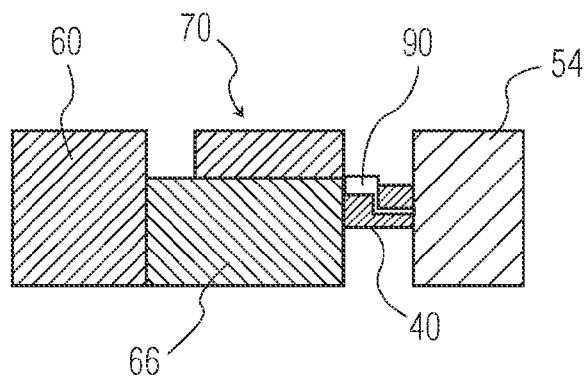
FIGS. 5A-5C are detailed cross section views of leaf springs for a MEMS scanning micromirror in accordance with the present invention.
Figure 5B:
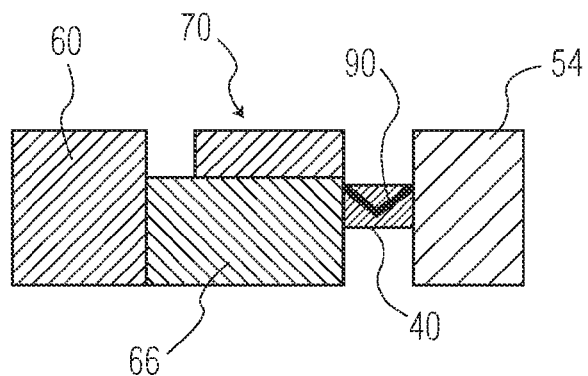
Figure 5C:
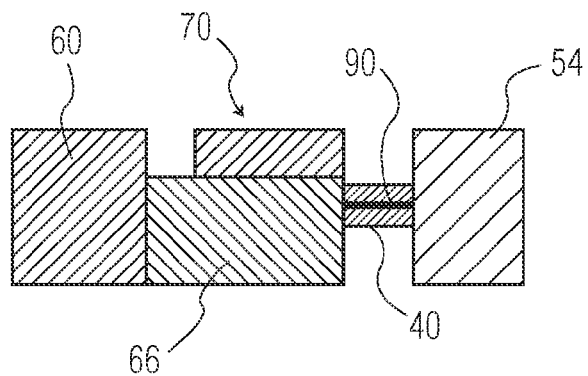

FIGS. 5A-5C, in which like elements share like reference numbers with each other and with FIG. 4, are detailed cross section views along section B-B of FIG. 4A of leaf springs for a MEMS scanning micromirror in accordance with the present invention. The leaf springs 90 have different shapes to provide different stiffness. Referring to FIGS. 5A, 5B, and 5C, the leaf springs 90 are L shaped, V shaped, and flat, respectively. The leaf springs 90 can be placed at about the same height relative to the mirror (in the Z direction) as the vertical support beams 40. In one embodiment, the lower leg of the L in the L shaped leaf spring is at the same height as the rotation axis 58. In one embodiment, the lower tip of the V in the V shaped leaf spring is at the same height as the rotation axis 58. In one embodiment, the flat leaf spring is at the same height as the rotation axis 58.

Figure 6:
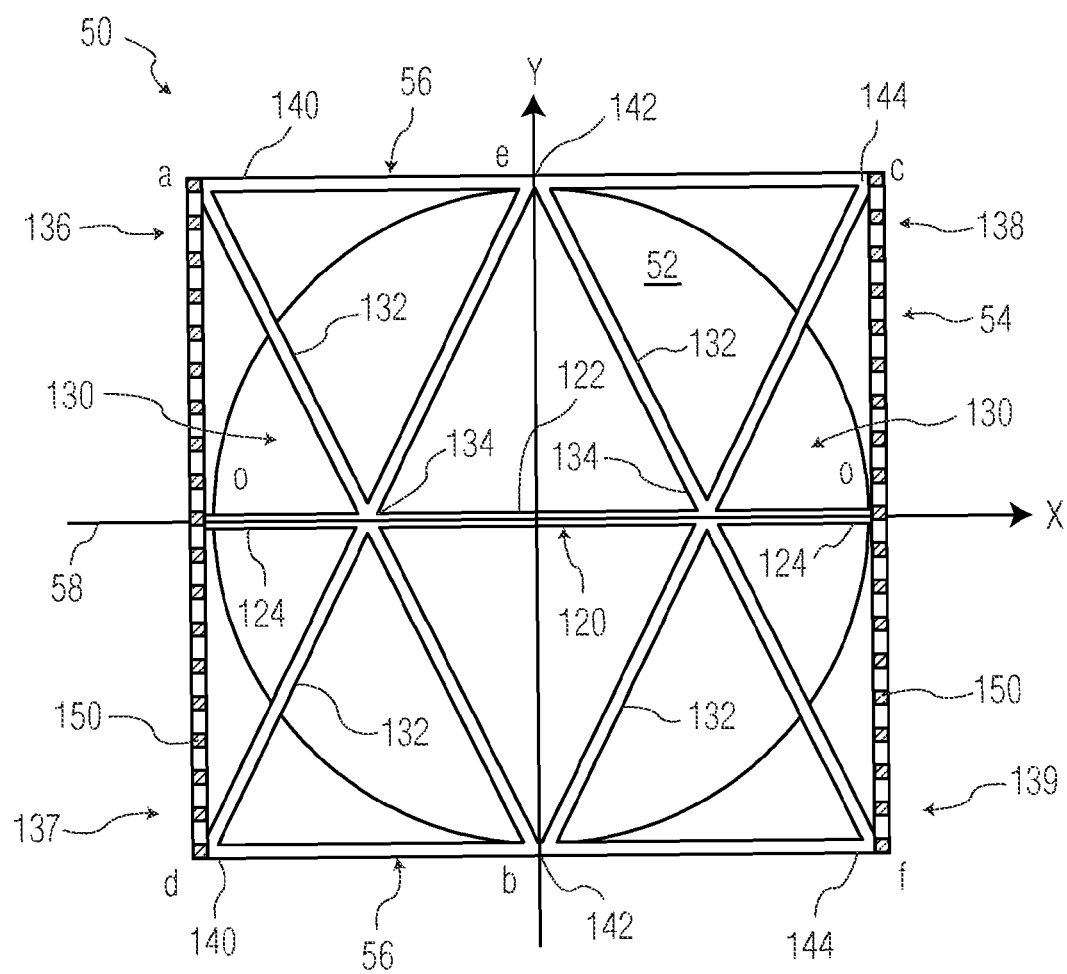
FIG. 6 is a bottom view of a mirror body for a MEMS scanning micromirror in accordance with the present invention.

FIG. 6, in which like elements share like reference numbers with FIG. 2, is a bottom view of a mirror body for a MEMS scanning micromirror in accordance with the present invention. In this example, the cross beams of the X beams have a uniform cross section. The mirror body 50 includes a mirror 52 and a mirror support 54. The mirror support 54 includes a rotation axis beam 120 having a rotation axis 58, extension bars 56 parallel to the rotation axis 58, and X beams 130. Each of the extension bars 56 has a first end 140, a midpoint 142, and a second end 144. Each of the X beams 130 has cross beams 132 connected at a cross midpoint 134. The ends 136, 137 of one of the X beams 130 are connected to the first end 140 and the midpoint 142 of the extension bars 56. The ends 138, 139 of the other of the X beams 130 are connected to the midpoint 142 and the second end 144 of the extension bars 56. The rotation axis beam 120 is connected to the cross midpoints 142 of the X beams 130. For both of the extension bars 56, the cross beams 132 connect the first end of one of the extension bars 56 to the midpoint of the other extension bars 56. This stiffens the mirror support 54 to reduce dynamic deformation. In one embodiment, the mirror support 54 can include optional side bars 150 connected between the first ends 140 of the extension bars 56 and connected between the second ends 144 of the extension bars 56, with the side bars 150 being perpendicular to the rotation axis 58. The optional side bars 150 are most useful for torsion beam suspended micromirror designs. In another embodiment, the optional side bars 150 can be omitted.

Those skilled in the art will appreciate that the mirror support with X beams can be used with cantilever beam assemblies or with torsion beams as desired for a particular application. With cantilever beam assemblies, the ends of the cantilever beam assemblies are coupled to the ends of the extension bars and the ends of the rotation axis beam are connected to opposed frame bars through vertical support beams. With torsion beams, the ends of the rotation axis beam can be connected to the recess periphery of the mirror recess of the frame.

Figure 7:
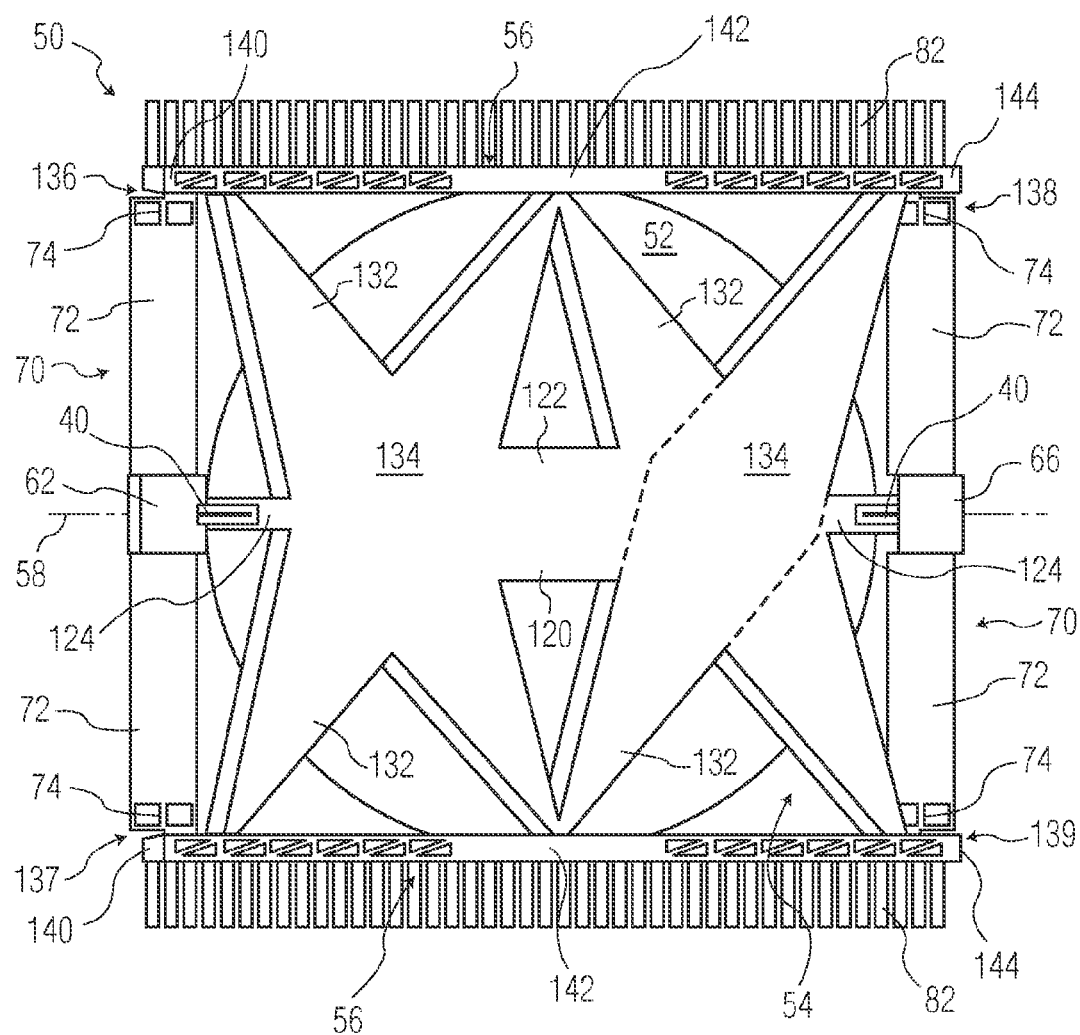
FIG. 7 is a bottom view of another embodiment of a mirror body for a MEMS scanning micromirror in accordance with the present invention.

FIG. 7, in which like elements share like reference numbers with FIGS. 2 and 6, is a bottom view of another embodiment of a mirror body for a MEMS scanning micromirror in accordance with the present invention. In this example, the cross beams of the X beams have a smaller cross section at the extension bar than at the rotation axis beam, and the cross beams are shaped like parallelograms. The parallelogram shape, which in this example is a rhombus, parallel the mirror plane can be observed by extending the edges of the cross beams into the rotation axis beam, as indicated by the dashed lines.

In this embodiment, the cantilever beam assembly 70 is fixed to one of the opposed frame bars 66 and coupled to the first end 140 of the extension bars 56 through the flexible links 74. The other cantilever beam assembly 70 is fixed to the other of the opposed frame bars 66 and is coupled to the second end 144 of the extension bars 56 through the flexible links 74. The vertical support beams 40 are connected between each of the pair of opposed frame bars 66 to ends 124 of the rotation axis beam along the rotation axis 58. Mirror combs 82 are attached to the extension bars 56. The rotation axis beam 120 has a larger cross section between the cross midpoints 134 at the rotation axis beam midpoint 122 than between the cross midpoint 134 and the end 124 of the rotation axis beam 120 nearer the cross midpoint 134.

FIGS. 8A-8B, in which like elements share like reference numbers with FIGS. 2 and 6, are top perspective and bottom perspective views, respectively, of a mirror body for a MEMS scanning micromirror in accordance with the present invention. The frame 60 has a mirror recess 62 with a recess periphery 64. A first opposed frame bar 66 and a second opposed frame bar 66 are located on the recess periphery 64 along the rotation axis 58. The opposed frame bars 66 are fixed to the cantilever beam assemblies 70 and coupled to the rotation axis beam through the vertical support beams 40.

FIGS. 9A-9B are graphs of Young's modulus for silicon with orientations of a mirror body for a MEMS scanning micromirror in accordance with the present invention. When single crystal silicon is used to fabricate the mirror body, for maximum bending stiffness the cross beams arranged in the X shape can be oriented along the direction of higher Young's modulus in the silicon wafer, i.e., along directions of higher material stiffness, to reduce dynamic deformation. FIGS. 9A-9B are graphs for (100) and (110) single crystal silicon wafers, respectively.

Referring to FIG. 9A, the rotation axes 58 of the rectangular mirror body 50a and the square mirror body 50b are oriented along the <100> or the <010> direction, orienting the cross beams 132 along the direction having the maximum Young's modulus (about 170 GPa). Those skilled in the art will appreciate that the rotation axis 58 of the mirror body 50 can also be oriented along the <100> direction or the <010> direction due to the symmetry of Young's modulus for (100) wafers.

Referring to FIG. 9B, for a maximum cross beam bending stiffness the rotation axis 58 of the mirror body 50a can be oriented along the <001> direction for rectangular or elliptical micromirror shapes with the major axis along the rotation axis 58. For maximum cross beam bending stiffness, the rotation axis 58 of the mirror body 50b can be oriented along the <001> direction for circular and square shaped micromirrors. When in particular mirror designs there might be a very small difference in the E-modulus along the cross beams 132 length with both <001> and <-110> orientations of the rotation axis on (110) wafers, those skilled in the art will appreciate that the mirror orientation can be selected for the desired bending stiffness of the cantilever beams 72 and the vertical support beams 40, or the desired torsion beam stiffness for a torsion beam suspended micromirror.

For (110) wafers as seen in FIG. 9B, circular and square shaped micromirrors have higher Young's modulus along the crossed beams when the micromirror tilt axis is oriented towards <001> direction. For devices with rectangular or elliptic micromirror shapes with long side along the rotation axis, the stiffness along the crossed beams is also higher when the rotation axis is oriented along <001> direction.

The method of manufacturing a mirror support for a MEMS scanning micromirror can include providing a single crystal silicon wafer having a direction of higher material stiffness; and forming the mirror support from the single crystal silicon wafer. The mirror support includes a rotation axis beam 120 having a rotation axis 58, a pair of extension bars 56 parallel to the rotation axis 58, a pair of X beams 130 having a pair of cross beams 132 connected to each of the pair of extension bars 56 and connected to the rotation axis beam 120 at a cross midpoint 134. The cross beams 132 are oriented along the direction of higher material stiffness. The forming of the mirror support from the single crystal silicon wafer can be performed by photolithography with any dry or wet etching techniques as desired for a particular application.

The rotation axis 58 can be oriented along different directions for different single crystal silicon wafers. When the single crystal silicon wafer is a (100) single crystal silicon wafer, the rotation axis 58 can be oriented along a <100> direction. When the single crystal silicon wafer is a (100) single crystal silicon wafer, the rotation axis 58 can be oriented along a <010> direction. When the single crystal silicon wafer is a (110) single crystal silicon wafer, the rotation axis 58 can be oriented along a <-110> direction. When the single crystal silicon wafer is a (110) single crystal silicon wafer, the rotation axis 58 can be oriented along a <001> direction.

FIG. 10, in which like elements share like reference numbers with FIGS. 2 and 6, is an end view of another embodiment of a mirror body for a MEMS scanning micromirror in accordance with the present invention. In this embodiment, the cross section of the extension bars 56 perpendicular to the rotation axis is a rectangle with a long axis 160 perpendicular to a mirror plane 162 and a short axis 164 parallel to the mirror plane 162. The high aspect ratio (height/width) of the extension bars 56 reduces dynamic deformation. In one embodiment, the aspect ratio can be between 4:1 and 6:1, such as 5:1.

FIGS. 11A-11E are detailed top views of flexible links of a mirror body for a MEMS scanning micromirror in accordance with the present invention. In FIG. 11A, the flexible link 74 is a high aspect ratio flexure connected to the cantilever beam at both ends and in the middle to the extension bars. Typical dimensions for 1 mm micromirror device are: Width 2.5-4 µm, length 60-80 µm, the height is the same as the thickness of the cantilever beams. The width at the connection points is around 10 µm. In FIG. 11B, the flexible link 74 includes additional flexure elements allowing small X-axis translations. In FIG. 11C-11D, the flexible link 74 allows a greater deformation in X direction while keeping a high bending stiffness in vertical direction and a high stiffness against in-plane rotation of the micromirror. The flexible links length is increased to reduce the stress caused by translation in X direction. In FIG. 11C, the flexible link is made in the same layer as the cantilever beams, so the stiffness of the flexure is limited by the thickness of the cantilevers. In FIG. 11D, the flexible link 74 has increased stiffness in the vertical direction and against bending in the Y-Z plane achieved by fabricating them with increased height in the bulk single crystal silicon material under the insulating layer. In this case, additional structure as an electrical connection is needed to provide the potential to the top part of the moveable comb fingers. In FIG. 11E, the flexible link 74 the L shaped flexible links (rotated at 45 degrees) connecting the extension bar and the cantilever beam.

FIG. 12 is a detailed perspective view illustrating dimensions of a mirror body for a MEMS scanning micromirror in accordance with the present invention. In one exemplary embodiment, the dimensions of the cantilever beams are:

Cantilever beam length $l_b$=420 µm
Cantilever beam width $w_b$=100 µm
Cantilever beam thickness $t_b$=17.5 µm
Distance between opposite suspension points a=950 µm.

In one exemplary embodiment, the dimensions of the vertical support beams are:

Vertical support beam width $w_{vs}$=6.2 µm
Vertical support beam height $h_{vs}$=36 µm
Vertical support beam length $l_{vs}$=62 µm In another exemplary embodiment, the dimensions of the vertical support beams providing a combined stiffness of the links in X direction is $1.25 \times 10^3$ N/m are:

Vertical support beam width $w_{vs}$=6.2 µm
Vertical support beam height $h_{vs}$=36 µm
Vertical support beam length $l_{vs}$=62 µm The combined stiffness of the vertical beams in X direction is $1.0 \times 10^4$ N/m. The beam stiffness dominates the horizontal slide natural frequency. The links and cantilever beam stiffness in Y direction define the in-plane rotation mode resonance frequency.

The oscillation frequency of the micromirror scanners depends from the torsional stiffness of the suspension and its mass inertia moment around the tilt axis. The torsional stiffness contributed by the cantilever beams bending stiffness dominates the fundamental mode resonant frequency of the micromirror. For small oscillation angles, this stiffness can be found from the following formula:

$$S_t = E \frac{a^2 \cdot w_b t_b^3}{4 l_b^3}$$

For a 1 mm micromirror, the torsional stiffness contributed by the cantilever beams is $2.3 \times 10^{-4}$ Nm/rad.

The torsional stiffness from the vertical support beams with the above given dimensions is $4.6 \times 10^{-6}$ Nm/rad, which is 50 times less than the delivered by the cantilever beams torsional stiffness. The vertical support beams influence with less than 1% the 18.7 kHz fundamental mode resonant frequency of our 1 mm micromirror design. The mass inertia moment is about $1.7 \times 10^{-14}$ kgm$^2$ The flexible links 74 with combined torsional stiffness around $1 \times 10^{-6}$ Nm/rad contribute even less to the increase of the micromirror fundamental mode frequency.

In the same design, the cantilever beams contribute with around $1.1 \times 10^3$ N/m bending stiffness to the out-of-plane oscillation mode, while the stiffness of the vertical support beams is $6.1 \times 10^5$ N/m.

The cantilever beams dominate the torsional stiffness of the micromirror. The vertical support beams dominate the stiffness for the out-of-plane oscillation modes, which have great impact on the image quality. The possibility to define the fundamental mode and the higher order resonance frequencies with a greater flexibility makes it easier to design better quality scanning systems. FEM Simulations showed that the combined suspension has advantages in preventing parasitic mode oscillations, as vertical and out-of-plain rocking, by increasing their resonance frequencies to greater values compared to torsion-beam suspended micromirrors.

The table below shows the simulation results for optimized geometries of two torsion-beam suspended micromirrors and a micromirror with combined suspension (having the same micromirror size; similar tilt stiffness, mass inertia moments, stress in the suspension elements and surface deformation):

| Frequency kHz | Torsion beam suspended micromirror with rectangular shape | Torsion beam suspended micromirror with circular shape | Micromirror with combined suspension |
|---|---|---|---|
| Fundamental mode | 18.6 | 18.7 | 18.7 |
| Vertical mode | 93 | 84 | 144 |
| Out of plane rocking | 230 | 245 | 255 |

While the embodiments of the invention disclosed herein are presently considered to be preferred, various changes and modifications can be made without departing from the scope of the invention. The scope of the invention is indicated in the appended claims, and all changes that come within the meaning and range of equivalents are intended to be embraced therein.

The invention claimed is:
1. A mirror support for a MEMS scanning micromirror comprising:
   a rotation axis beam having a rotation axis;
   a pair of extension bars parallel to the rotation axis, each of the pair of extension bars having a first end, a midpoint, and a second end; and a pair of X beams, each of the pair of X beams having a cross midpoint;
wherein one of the pair of X beams is connected to the first end and the midpoint of each of the pair of extension bars;
the other of the pair of X beams is connected to the midpoint and the second end of each of the pair of extension bars; and
the rotation axis beam is connected to the cross midpoint of each of the pair of X beams.

2. The mirror support of claim 1 wherein each of the pair of X beams further comprises a pair of cross beams connected at the cross midpoint, each of the cross beams having a uniform cross section between the extension bar and the rotation axis beam.

3. The mirror support of claim 1 wherein each of the pair of X beams further comprises a pair of cross beams connected at the cross midpoint, each of the cross beams having a smaller cross section at the extension bar than at the rotation axis beam.

4. The mirror support of claim 3 wherein each of the pair of cross beams are parallelogram shaped.

5. The mirror support of claim 1 wherein the rotation axis beam has a larger cross section between the cross midpoints than between the cross midpoint and an end of the rotation axis beam.

6. The mirror support of claim 1 further comprising a pair of side bars connected between the first ends of the pair of extension bars and connected between the second ends of the pair of extension bars, the pair of side bars being perpendicular to the rotation axis.

7. The mirror support of claim 1 wherein the cross section perpendicular to the rotation axis of each of the pair of extension bars is a rectangle, the rectangle having a long axis perpendicular to a mirror plane.

8. The mirror support of claim 1 further comprising:
a frame forming a mirror recess with a recess periphery, the frame having a pair of opposed frame bars on the recess periphery along the rotation axis;
a pair of cantilever beam assemblies, one of the pair of cantilever beam assemblies being fixed to one of the pair of opposed frame bars and coupled to the first end of each of the pair of extension bars, the other of the pair of cantilever beam assemblies being fixed to the other of the pair of opposed frame bars and coupled to the second end of each of the pair of extension bars; and
a pair of vertical support beams connected between each of the pair of opposed frame bars to ends of the rotation axis beam along the rotation axis.

9. The mirror support of claim 1 further comprising a frame forming a mirror recess with a recess periphery, wherein ends of the rotation axis beam are connected to the recess periphery.

10. The mirror support of claim 1 wherein each of the pair of X beams further comprises a pair of cross beams connected at the cross midpoint, the mirror support is formed from single crystal silicon having a direction of higher material stiffness, and the cross beams are oriented along the direction of higher material stiffness.

11. A mirror support for a MEMS scanning micromirror comprising:
a rotation axis beam having a rotation axis;
a first extension bar parallel to the rotation axis;
a second extension bar parallel to the rotation axis;
a first X beam; and
a second X beam;
wherein the first X beam is connected between the first extension bar and the second extension bar;
the second X beam is connected between the first extension bar and the second extension bar, the second X beam being adjacent the first X beam; and
the rotation axis beam is connected to a cross midpoint of the first X beam and a cross midpoint of the second X beam.

12. The mirror support of claim 11 wherein the first X beam comprises a first cross beam having a uniform cross section between the first extension bar and the rotation axis beam and a second cross beam having a uniform cross section between the first extension bar and the rotation axis beam.

13. The mirror support of claim 11 wherein the first X beam comprises a first cross beam having a smaller cross section at the first extension bar than at the rotation axis beam and a second cross beam having a smaller cross section at the first extension bar than at the rotation axis beam.

14. The mirror support of claim 13 wherein the first cross beam and the second cross beam are parallelogram shaped.

15. The mirror support of claim 11 wherein the rotation axis beam has a larger cross section between the cross midpoint of the first X beam and the cross midpoint of the second X beam than at an end of the rotation axis beam.

16. The mirror support of claim 11 further comprising a first side bar connected between first ends of the first extension bar and the second extension bar, and a second side bar connected between second ends of the first extension bar and the second extension bar, the first side bar and the second side bar being perpendicular to the rotation axis.

17. The mirror support of claim 11 wherein the cross section perpendicular to the rotation axis of each of the first extension bar and the second extension bar is a rectangle, the rectangle having a long axis perpendicular to a mirror plane.

18. The mirror support of claim 11 further comprising:
a frame forming a mirror recess with a recess periphery, the frame having a pair of opposed frame bars on the recess periphery along the rotation axis;
a pair of cantilever beam assemblies, one of the pair of cantilever beam assemblies being fixed to one of the pair of opposed frame bars and coupled to a first end of the first extension bar and the second extension bar, the other of the pair of cantilever beam assemblies being fixed to the other of the pair of opposed frame bars and coupled to a second end of the first extension bar and the second extension bar; and
a pair of vertical support beams connected between each of the pair of opposed frame bars to ends of the rotation axis beam along the rotation axis.

19. The mirror support of claim 11 further comprising a frame forming a mirror recess with a recess periphery, wherein ends of the rotation axis beam are connected to the recess periphery.

20. The mirror support of claim 11 wherein the first X beam comprises a first cross beam and a second cross beam connected at the cross midpoint, the mirror support is formed from single crystal silicon having a direction of higher material stiffness, and the first cross beam is oriented along the direction of higher material stiffness.

21. The mirror support of claim 20 wherein the second cross beam is oriented along the direction of higher material stiffness.

22. A method of manufacturing a mirror support for a MEMS scanning micromirror comprising:
providing a single crystal silicon wafer having a direction of higher material stiffness; and
forming the mirror support from the single crystal silicon wafer, the mirror support comprising a rotation axis beam having a rotation axis, a pair of extension bars parallel to the rotation axis, a pair of X beams having a pair of cross beams connected to each of the pair of extension bars and connected to the rotation axis beam at a cross midpoint;

wherein the cross beams are oriented along the direction of higher material stiffness.

23. The method of claim 22 wherein the single crystal silicon wafer is a (100) single crystal silicon wafer and the rotation axis is oriented along a <100> direction.

24. The method of claim 22 wherein the single crystal silicon wafer is a (100) single crystal silicon wafer and the rotation axis is oriented along a <010> direction.

25. The method of claim 23 wherein the single crystal silicon wafer is a (110) single crystal silicon wafer and the rotation axis is oriented along a <001> direction.

* * * * *